2,694,709

HALOGENATED TRIAZINE VAT DYES

Asa Willard Joyce, Plainfield, N. J., assignor to American Cyanamid Company, New York, N. Y., a corporation of Maine No Drawing. Application May 7, 1953, Serial No. 353,686

17 Claims. (Cl. 260—249)

This invention relates to an improved process for preparing new vat dyestuffs of the formula

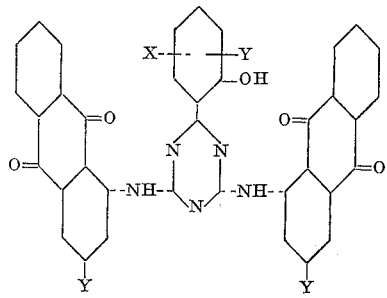

in which X is halogen and Y is hydrogen or halogen.

The dyestuffs, particularly those containing chlorine, are yellow dyestuffs of improved characteristics and a bright green yellow shade of great clarity and further they show a high degree of light fastness, and superior stability of their leuco compounds. The characteristics of these dyestuffs are such that they approximate in shade the important commercial product known as Vat Yellow GC having the formula

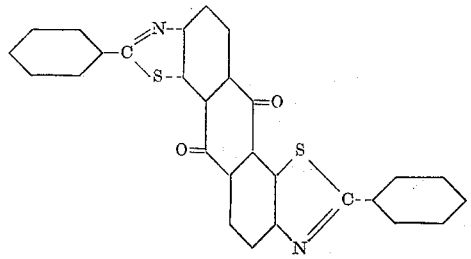

However, they are superior in light fastness thereto and do not suffer a shift in shade toward the brown on fading, an important factor when the yellow dyestuff is to be used in blends. These new dyestuffs are claimed as new chemical compounds in the copending application of Gadea and Munro, Serial No. 348,118, filed April 10, 1953, and are not claimed as new chemical compounds in the present application. In the Gadea and Munro application referred to above, there is also described and claimed a method of preparing the dyestuffs by condensing a 2-(2-hydroxy-dihalophenyl)-4,6-dihalo-1,3,5-triazine with an alphaamino anthraquinone. The process is workable but does not give as good yield or a product of as high purity as could be desired.

According to the present invention, I have found that an improved process giving very high yields of pure product is achieved if 2-(o-hydroxyphenyl)-4,6-di(alpha-anthraquinonylamino)1,3,5-triazines are chlorinated or brominated to introduce the desired halogen in the o-hydroxyphenyl group. Ordinarily it might be expected that the direct halogenation of so large a molecule with so many other positions in which halogen can enter would be undesirable and would give side reactions, mixtures of products and the like. I have found, however, that the halogen goes only into the o-hydroxyphenyl group and instead of poorer yields, better yields of a purer product are obtained. Why this result is obtained, is not known and the invention is not intended to be limited to any theory.

The halogenation method proceeds smoothly. In general, two main methods are used. One involves the use of a sulfuryl halide, such as sulfuryl chloride in a high boiling organic solvent, typical of which are nitrobenzene, dichlorobenzene, trichlorobenzene and the like. While the various organic solvents may be used in the process, their behavior is not identical. Orthodichlorobenzene when used with a proper amount af halogenating agent results in the introduction of only a single halogen; whereas, mononitrobenzene favors the introduction of two halogens. The method by which the different solvents favor different degrees of halogenation is not, as yet, known and therefore the invention is not limited to any theoretical explanation thereof.

An alternative method is to carry out the reaction in sulfuric acid solution using free chlorine or bromine in the presence of a halogen carrier, such as iodine, ferric chloride and the like. Only chlorine and bromine can be introduced by the method of the present invention which is not applicable to the introduction of either fluorine or iodine. The position of the halogen atoms in the phenyl ring is not completely determined. It seems likely that the chlorination or bromination is ortho and para to the hydroxyl group in the phenyl ring. However, since there has not as yet been developed rigorous proof for the position, the invention is not limited thereto and in the formulae the position of the two halogens in the phenyl ring are not specified.

It is an advantage of the present invention that the halogen in the hydroxyphenyl ring need not be the same as the halogen in the two anthraquinone radicals when they are halogenated. It is thus possible to obtain a number of variations which add to the flexibility of the invention and the scope of the products obtainable thereby.

The invention will be described in greater detail in conjunction with the following specific examples, the parts being by weight unless otherwise specified.

EXAMPLE 1

*o-Methoxybenzoyldicyandiamide*

A slurry of 120 parts of acetone and 21 parts of dicyandiamide is cooled to 5–10° C. and treated with 26.4 parts of potassium hydroxide. After stirring at 0–5° C. until the reaction is substantially complete, the mixture is cooled below 0° C. and there is slowly added to it a solution of 34.1 parts of o-methoxybenzoyl chloride in 120 parts of acetone. Stirring is then continued until the reaction mixture comes to room temperature. It is diluted to approximately the volume of 1000 parts of water, and slowly acidified with approximately 14 parts of acetic acid. The resulting product is stirred thoroughly, filtered, washed, and air dried. It melts approximately at 186° C.

EXAMPLE 2

*o-Methoxybenzoylbiuret*

A mixture of 80 parts of o-methoxybenzoyldicyandiamide, prepared as described in Example 1, 400 parts of water, and 67 parts of concentrated hydrochrolic acid is gradually heated to reflux with stirring, and refluxed until the biuret formation is complete. The slurry is then cooled to 0–5° C. and filtered. The product is washed with very dilute hydrochrloric acid and air dried. It melts approximately at 185° C.

EXAMPLE 3

*o-Methoxybenzoguanamide*

54.3 parts of o-methoxybenzoylbiuret, prepared as in Example 2, is dissolved in a solution of 30.2 parts potassium hydroxide in 600 parts of water, and stirred at room temperature until ring closure has been effected, the reaction being slower than in the two preceding examples. The product is precipitated by careful acidification with approximately 21 parts of acetic acid, and then cooled and filtered. It melts approximately at 250° C.

EXAMPLE 4

*2-o-methoxyphenyl dichlorotriazine*

A mixture of 10 parts of o-methoxybenzoguanamide, prepared as in Example 3, 21 parts phosphorus pentachloride, and 46 parts phosphorus oxychloride, is refluxed until chlorination is complete. The product is then drowned rapidly in about 800 parts of a mixture if ice and wated, stirred vigorously, filtered, washed, and dried. It may be purified by dissolving in benzene, filtering, and evaporating to dryness. It melts approximately at 136° C.

EXAMPLE 5

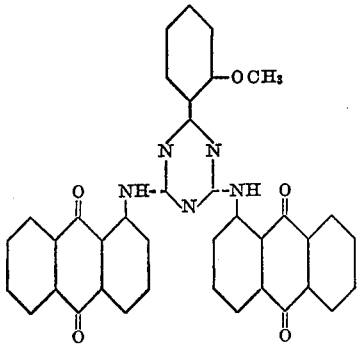

A mixture of 128 parts of 2-(o-methoxyphenyl)-4,6-dichlorotriazine, prepared as in Example 4, 223 parts of alpha-aminoanthraquinone, and 1200 parts of nitrobenzene, is stirred and heated at 120° C. until the condensation is effected. It is then allowed to cool to room temperature and filtered. The product is washed with nitrobenzene and alcohol, and then dried at 60° C.

EXAMPLE 6

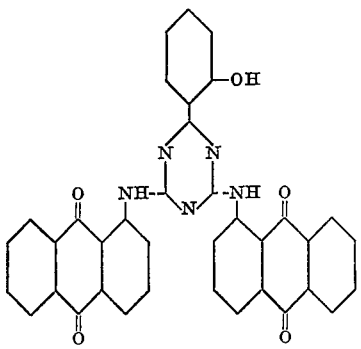

A slurry of 30 parts of product of Example 5 in 360 parts of nitrobenzene is stirred and heated to 135° C. A vigorous stream of dry hydrogen chloride gas is passed through the mixture for a few minutes at intervals, while the mixture is stirred and gradually heated to 200° C. The mixture is then cooled and filtered. The product is washed with nitrobenzene and alcohol, and dried at 60° C. It is a very bright greenish shade yellow of excellent fastness and high color strength. It dyes well on rayon and wool as well as cotton, and can be acid pasted in the normal manner from concentrated sulfuric acid.

EXAMPLE 7

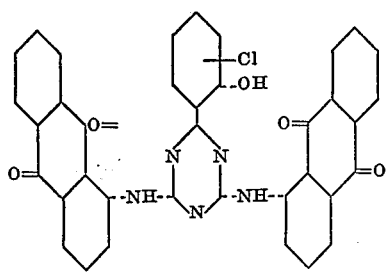

27.6 parts of 2-(o-hydroxyphenyl)-4,6-di(alpha-amino anthraquinonyl)-1,3,5-triazine, finely ground, 300 parts of dichlorobenzene, and 0.6 part of iodine are stirred together while adding gradually 27.0 parts of sulfuryl chloride. The mixture is then heated at 50° C. until monochlorination has occurred. The mass is blown with air to remove excess sulfuryl chloride. The chlorinated product is then filtered and washed with dichlorobenzene and alcohol. An excellent yield of the monochlorinated dye is obtained. It is a yellow powder which dissolves in conc. H₂SO₄ with a yellow color and dyes a greener shade of yellow than the unchlorinated dye.

EXAMPLE 8

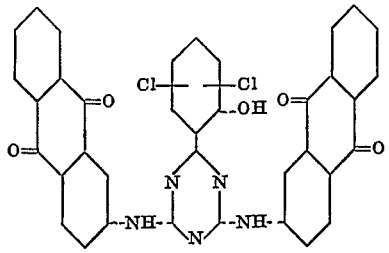

The procedure of Example 7 is repeated substituting an equivalent amount of mononitrobenzene for the ortho-dichlorobenzene. Dichlorination of the hydroxyphenyl ring takes place instead of monochlorination.

EXAMPLE 9

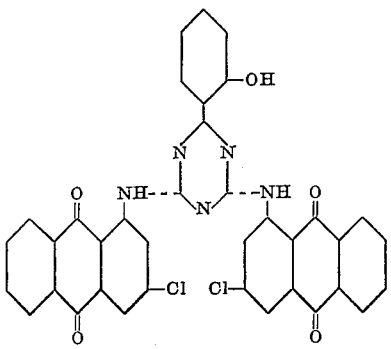

A mixture of 15.0 parts of o-methoxyphenyl dichlorotriazine and 25.3 parts of 3-chloro-1-aminoanthraquinone in 260 parts of o-dichlorobenzene is heated to 140° C. and stirred at this temperature until condensation is complete. The reaction mixture is then cooled and filtered. The product is washed with o-dichlorobenzene followed by alcohol. An excellent yield is obtained; the product is demethylated as follows:

46 parts of the reaction product is slurried in 520 parts of o-dichlorobenzene, stirred and heated to 140° C., and treated with a stream of dry hydrogen bromide at this temperature until dealkylation is effected. The mixture is then cooled and filtered. The product is washed with o-dichlorobenzene, followed by alcohol and water. An excellent yield is obtained.

Similar results are obtained under the same reaction conditions if a stream of hydrogen iodide is used instead of hydrogen bromide.

EXAMPLE 10

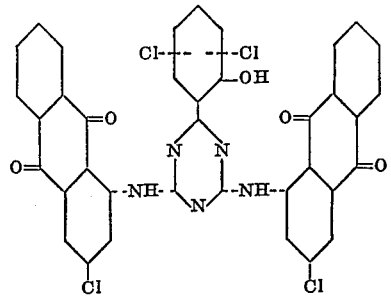

118 parts of 2-(o-hydroxyphenyl)-4,6-di(3-chloro-1-anthraquinonyl)amino-1,3,5-triazine is stirred into 2,000 parts of nitrobenzene and 1.2 parts of iodine is added. 95 parts of sulfuryl chloride is then gradually introduced while the mass is well agitated. The temperature is then raised gradually to 60° C., and the stirring continued at 60–65° C. until the reaction is substantially complete. Excess of sulfuryl chloride is removed by blowing with air while allowing the slurry to cool to about 30° C. The separated dye is then filtered and washed with nitrobenzene and alcohol or the nitrobenzene may be removed from the cake by steaming, and the aqueous slurry filtered. After it is dried at 60–70° C. the dye is obtained in nearly theoretical yield as a bright yellow product. It dissolves in concentrated sulfuric acid with a yellow color and dyes cellulosic fibers from a red vat in bright greenish-yellow shades which have excellent fastness properties. Analysis shows it to be a tetrachloro compound.

EXAMPLE 11

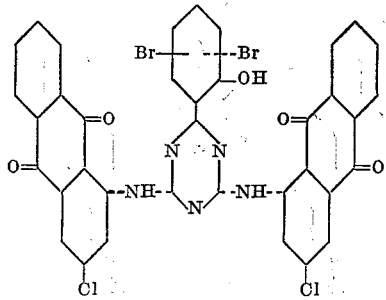

69 parts of 2-(o-hydroxyphenyl)-4,6-di(3-chloro-1-anthraquinonyl) amino-1,3,5-triazine and 1.0 part of iodine are stirred into 1,250 parts of nitrobenzene. The mixture was heated to 75° C. and then a mixture of 20.0 parts of bromine and 17.0 parts of sulfuryl chloride is gradually added. The mass is then stirred at 75-80° C. until the reaction is substantially complete. Excess bromine and sulfuryl chloride are removed by blowing with air while permitting the mass to cool to about 30° C. The slurry is then filtered, washed with nitrobenzene and alcohol, and dried. The dyestuff is obtained in nearly theoretical yield as a bright yellow body. It dissolves in concentrated sulfuric acid with a yellow color and dyes cellulosic fibers from a claret red vat bright yellow shades, slightly redder than the dyestuff prepared in Example 10, but exhibiting excellent fastness properties. Analysis shows it to be a dichlorodibromo compound.

EXAMPLE 12

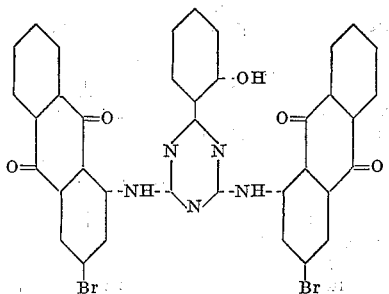

The procedure of Example 9 is repeated replacing the 3-chloro-1-aminoanthraquinone with an equivalent amount of the 3-bromo-1-aminoanthraquinone.

EXAMPLE 13

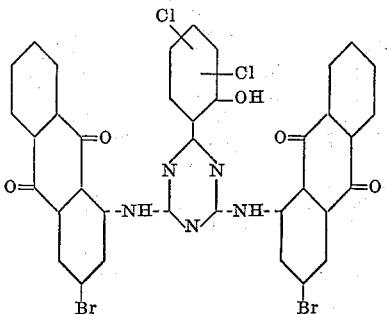

78 parts of 2-(o-hydroxyphenyl)-4,6-di(3-bromo-1-anthraquinonyl) amino-1,3,5-triazine and 1.0 part of iodine are introduced into 1,250 parts of nitrobenzene. The mixture is well agitated while 54.0 parts of sulfuryl chloride is gradually added. The mass is then heated to 75° C. and stirred at this temperature for 20 hours. After blowing with air to remove the excess sulfuryl chloride, the dye is isolated in the usual way by filtering, washing, and drying, and is found to be a bright yellow powder, difficultly soluble in hot organic solvents, soluble in concentrated sulfuric acid with a yellow color. It dyes cellulosic fibers bright yellow shades somewhat redder than the dyestuff prepared in Example 10, but exhibiting similar excellent fastness properties. According to analysis the product is a dichlorodibromo compound.

EXAMPLE 14

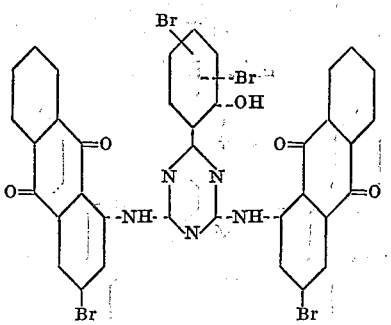

79 parts of 2-(o-hydroxyphenyl)-4,6-di(3-bromo-1-anthraquinonyl) amino-5-triazine are stirred into 1,250 parts of nitrobenzene and 1.0 parts of iodine is added. The mass is heated to 50° C. and a mixture of 24 parts of bromine, 21 parts of sulfuryl chloride, and 25 parts of nitrobenzene is gradually introduced. The mixture is then heated gradually to 75° C. and stirred further at this temperature until the reaction is substantially complete. Excess of sulfuryl chloride and bromine is removed by blowing with air while cooling to about 30° C. The new yellow dye is then isolated by filtration, washing, and drying as described in Example 10. The dye is obtained in excellent yield as a bright yellow powder which dissolves in concentrated sulfuric acid with a yellow color and dyes cellulosic fibers from a claret red vat in bright yellow shades which are somewhat redder than the dyestuff prepared according to Example 13.

EXAMPLE 15

69 parts of 2-(o-hydroxyphenyl)-4,6-di(3-chloro-1-anthraquinonyl) amino-1,3,5-triazine is dissolved at 10-15° C. in 1,000 parts of sulfuric acid, 100%. One part of iodine is added, and the mass is cooled to 5° C. A slow stream of chlorine is passed into the sulfuric acid solution of the dye until two chlorine atoms have been introduced into the dye molecule and a tetrachloro compound has been formed. The reaction mass is then drowned in 10,000 parts of water, and unreacted chlorine is removed by the addition of a little sodium sulfite. The yellow slurry is filtered, washed acid free, and the new dyestuff is dried. The yield is nearly theoretical and the dye so obtained is identical with the dye prepared in Example 10.

EXAMPLE 16

35 parts of 2-(o-hydroxyphenyl)-4,6-di(3-chloro-1-anthraquinonyl) amino-1,3,5-triazine dissolved in 750 parts of concentrated sulfuric acid at 10-15° C. Five-tenths part of iodine is added. The mixture is cooled to 5° C., and then 20 parts of bromine is gradually added. The mass is further stirred at 5° C. until the reaction is substantially complete. The mixture is then drowned in 800 parts of water, and the dye is isolated by filtration, washing and drying.

It has similar shade and dyeing properties to the dye prepared in Example 11.

EXAMPLE 17

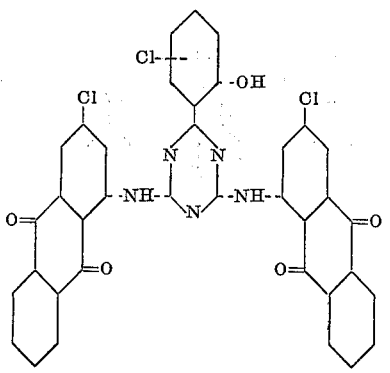

The procedure of Example 7 is followed replacing the 2-(o - hydroxyphenyl)-4,6-di(alpha-aminoanthraquinon-yl)-1,3,5-triazine with an equivalent amount of 2-(2-hydroxyphenyl) - 4,6 - di(3 - chloroanthraquinonyl - 1-amino)-1,3,5-triazine. A good yield of the monochlorinated compound is obtained which dyes cloth greener shades of yellow than the dyestuff of Example 7.

EXAMPLE 18

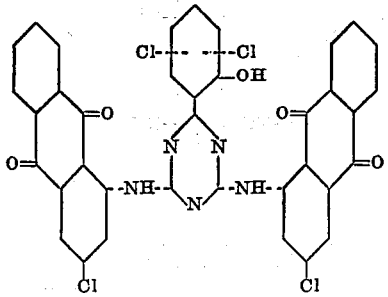

124 parts of the product of Example 17 is chlorinated with 50 parts of sulfuryl chloride in 2000 parts of nitrobenzene using the procedure of Example 10. The product which is obtained in good yield is identical with that of Example 10 and produces the same shade when dyed on cellulosic fibers.

EXAMPLE 19

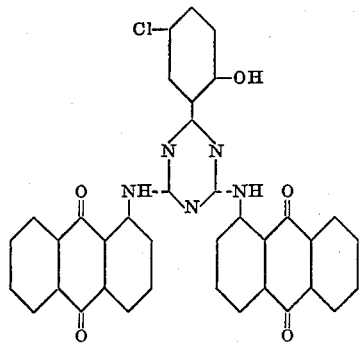

The procedures of Examples 1 to 6 are repeated substituting in Example 1 2-methoxy-5-chlorobenzoylchloride for the ortho-methoxy-benzoylchloride.

EXAMPLE 20

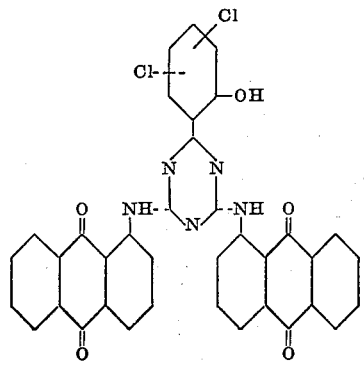

The procedure of Example 7 is followed replacing the 2-(o-hydroxyphenyl) - 4,6-di(alpha-aminoanthraquinon-yl)-1,3,5-triazine by an equivalent amount of the product of Example 19. A good yield of yellow dye is obtained which dyes cellulosic fibers a green shade of yellow substantially the same as that of the product of Example 8.

What I claim is:

1. A process which comprises reacting a triazine compound of the formula

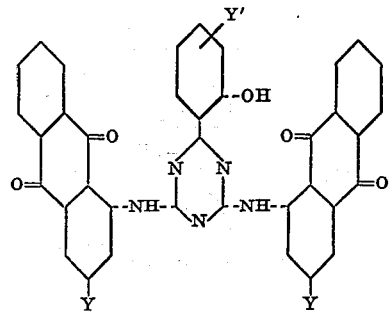

in which Y and Y' represent a substituent selected from the group consisting of hydrogen and a halogen selected from the class consisting of chlorine and bromine, with a halogenating agent capable of introducing a halogen of the group consisting of chlorine and bromine into the hydroxyphenyl ring of said triazine compound, until at least one such halogen is introduced into the said hydroxyphenyl ring thereof, the said halogenating agent being selected from the class consisting of elemental chlorine and bromine and the sulfuryl halides thereof.

2. A process according to claim 1 in which the halogenating agent is elemental halogen selected from the group consisting of chlorine and bromine and the reaction is carried out in solution in concentrated sulfuric acid.

3. A process according to claim 2 in which Y is chlorine.

4. A process according to claim 3 in which the halogen is chlorine.

5. A process according to claim 1 in which Y is bromine and the halogenating agent is elemental halogen selected from the class consisting of chlorine and bromine, the reaction taking place in sulfuric acid solution.

6. A process according to claim 5 in which the halogen is bromine.

7. A process according to claim 1 in which Y is bromine and the halogenating agent is chlorine.

8. A process according to claim 1 in which the halogenating agent is a sulfuryl halide and the reaction is effected in an inert high-boiling organic medium.

9. A process according to claim 8 in which Y is chlorine.

10. A process according to claim 9 in which the sulfuryl halide is sulfuryl chloride.

11. A process according to claim 1 in which Y is bromine, the halogenating agent is a sulfuryl halide and the reaction is effected in an inert, high-boiling organic medium.

12. A process according to claim 1 in which the halogenating agent is a mixture of sulfuryl chloride and elemental bromine.

13. A process according to claim 1 in which the reaction is carried out in a reaction medium comprising mononitrobenzene as its main ingredient whereby 2 halogens are introduced into the hydroxyphenyl ring.

14. A process according to claim 13 in which the halogenating agent is an elemental halogen selected from the group consisting of chlorine and bromine.

15. A process according to claim 14 in which the halogen is chlorine.

16. A process according to claim 1 in which the halogenating agent is a sulfuryl halide and the reaction medium comprises mononitrobenzene as its principal ingredient whereby 2 halogens are introduced into the hydroxyphenyl ring.

17. A process according to claim 16 in which the sulfuryl halide is sulfuryl chloride.

No references cited.